(12) United States Patent
Areno

(10) Patent No.: US 9,208,355 B1
(45) Date of Patent: Dec. 8, 2015

(54) APPARATUS, SYSTEM AND METHOD FOR PROVIDING CRYPTOGRAPHIC KEY INFORMATION WITH PHYSICALLY UNCLONABLE FUNCTION CIRCUITRY

(71) Applicant: Sandia Corporation, Albuquerque, NM (US)

(72) Inventor: Matthew Areno, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 273 days.

(21) Appl. No.: 13/903,813

(22) Filed: May 28, 2013

(51) Int. Cl.
*G06F 21/00* (2013.01)
*G06F 21/72* (2013.01)
*H04L 9/32* (2006.01)
*G06F 21/31* (2013.01)

(52) U.S. Cl.
CPC .............. *G06F 21/72* (2013.01); *H04L 9/3271* (2013.01); *H04L 9/3278* (2013.01); *G06F 21/31* (2013.01)

(58) Field of Classification Search
CPC . G06F 21/31; G06F 2221/2129; G06F 21/72; H04L 9/3271; H04L 9/3278; H04L 2209/12; H04L 2209/805
USPC ........................................................ 713/192
See application file for complete search history.

(56) References Cited

U.S. PATENT DOCUMENTS

| | | | |
|---|---|---|---|
| 8,516,269 B1 * | 8/2013 | Hamlet et al. | 713/189 |
| 8,667,265 B1 * | 3/2014 | Hamlet et al. | 713/150 |
| 2009/0083833 A1 | 3/2009 | Ziola et al. | |
| 2010/0322418 A1 * | 12/2010 | Potkonjak | 380/255 |
| 2011/0299678 A1 * | 12/2011 | Deas et al. | 380/28 |
| 2012/0204023 A1 * | 8/2012 | Kuipers et al. | 713/150 |
| 2013/0019105 A1 * | 1/2013 | Hussain | 713/189 |
| 2014/0013123 A1 * | 1/2014 | Khazan et al. | 713/189 |
| 2014/0108786 A1 * | 4/2014 | Kreft | 713/156 |

FOREIGN PATENT DOCUMENTS

WO   WO-2011/088074   7/2011

OTHER PUBLICATIONS

Areno, M. C. et al., "Securing Trusted Execution Environments with PUF Generated Secret Keys," TrustCom, 2012 IEEE 11th International Conference on Trust, Security and Privacy in Computing and Communications, pp. 1188-1193, Jun. 2012.

(Continued)

*Primary Examiner* — Mohammad A Siddiqi
(74) *Attorney, Agent, or Firm* — Blakely, Sokoloff, Taylor & Zafman LLP

(57) ABSTRACT

Techniques and mechanisms for providing a value from physically unclonable function (PUF) circuitry for a cryptographic operation of a security module. In an embodiment, a cryptographic engine receives a value from PUF circuitry and based on the value, outputs a result of a cryptographic operation to a bus of the security module. The bus couples the cryptographic engine to control logic or interface logic of the security module. In another embodiment, the value is provided to the cryptographic engine from the PUF circuitry via a signal line which is distinct from the bus, where any exchange of the value by either of the cryptographic engine and the PUF circuitry is for communication of the first value independent of the bus.

20 Claims, 7 Drawing Sheets

(56) References Cited

OTHER PUBLICATIONS

Areno, M. C. "Strengthening Embedded System Security with PUF Enhanced Cryptographic Engines", Dissertation, Ph.D., Electrical and Computer Engineering, University of New Mexico, 160 pgs., Apr. 2013.

Ibrahim, O. A. et al., "Cyber-Physical Security Using System-Level PUFs", 2011 IEEE 7th International Wireless Communications and Mobile Computing Conference, pp. 1672-1676, Jul. 2011.

Lee, J. W. et al., "A Technique to Build a Secret Key in Integrated Circuits for Identification and Authentication Applications", MIT Computer Science and Artificial Intelligence Lab (CSAIL), Cambridge, MA 02139, 4 pgs., Jun. 2004.

Suh, G. E. et al., Physical Unclonable Functions for Device Authentication and Secret Key Generation, DAC 2007, Jun. 4-8, 2007, San Diego, California, USA, Copyright 2007 ACM 978-1-59593-627-1/07/0006, 6 pgs.

U.S. Appl. No. 12/844,860, entitled "Deterrence of Device Counterfeiting, Cloning, and Subversion by Substitution Using Hardware Fingerprinting", filed Jul. 28, 2010.

* cited by examiner

APPARATUS, SYSTEM AND METHOD FOR PROVIDING CRYPTOGRAPHIC KEY INFORMATION WITH PHYSICALLY UNCLONABLE FUNCTION CIRCUITRY

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to trusted computing, and in particular but not exclusively, relates to hardware for protection against subversion by substitution.

BACKGROUND INFORMATION

Trustworthy computing cannot exist without trustworthy hardware to perform such computing. Even if an integrated circuit is produced using rigorous procedures in a "Trusted Foundry" and certified as "trustworthy," existing security mechanisms are often subject to wholesale replacement of the component with a separately manufactured but subverted "look-alike" after the point of certification. Without detection of subversion by wholesale component substitution, today's information processing systems are vulnerable to sophisticated adversaries that can fabricate "look-alike" components that perform the same function as the intended component but which may contain additional subversion artifices that can be later triggered by an adversary to disrupt or compromise operation.

Using physical system protection schemes to prevent subversive attacks in deployed information processing hardware is technically difficult and expensive. An alternative to resisting subversive attack with physical system protection schemes is to employ robustly authenticated and protected hardware architectures to enable tracing of the origin of these components. Physically Unclonable Function (PUF) technology may be leveraged to deter adversaries from attempting subversion by insertion of subversive functionality and also by instantiation of counterfeit components (subversion via substitution). PUFs are derived from the inherently random, physical characteristics of the material, component, or system from which they are sourced, which makes the output of a PUF physically or computationally very difficult to predict. Silicon-based microelectronics appear to be a potentially rich source of PUFs because subtle variations in the production processes result in subtle variations in the physical and operational properties of the fabricated devices. Additionally, each device can have millions of exploitable transistors, circuits, and other active and passive components. Accordingly, PUFs extracted from microelectronics are of keen interest because of their potential applications to cyber security.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
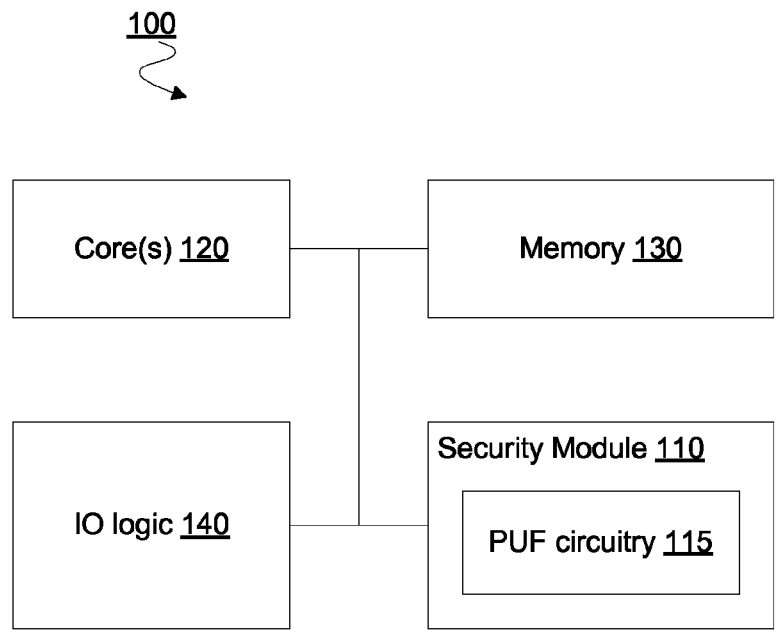
FIG. 1 is a block diagram illustrating elements of a system for securing data according to an embodiment.

Embodiments of a system and method for providing cryptographic key information are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

Embodiments discussed herein include techniques and mechanisms to variously provide enhanced security of electronic devices using Physical Unclonable Function (PUF) circuitry. The order in which some or all of the process blocks appear in each process should not be deemed limiting. Rather, one of ordinary skill in the art having the benefit of the present disclosure will understand that some of the process blocks may be executed in a variety of orders not illustrated.

Certain embodiments include architectures which variously exploit low-level fabrication defects and/or differences in integrated circuitry to generate a PUF value which is inaccessible to one or more elements—e.g. circuit logic, a software process, etc.—of a platform which includes the integrated circuitry. For example, the PUF value may be directly accessible (e.g. identifiable) by at least some logic of a security module, but may be unidentifiable by other logic of the security module, by logic of the platform which is external to the security module, by a manufacturer of the security module and/or the like.

Existing methodologies typically store a cryptographic key and other security-critical information in nonvolatile storage—e.g. read-only memory, e-FUSES and/or the like—of dedicated security hardware. However, such stored keys are included in or otherwise accessible to control circuitry, are typically the same within an entire family of devices and may be circumvented, for example, by replacement of the dedicated security hardware with malicious hardware. In certain embodiments, PUF circuitry includes functionality for generating a unique device-specific (or "per-device") value that can be used, for example, as a secret, symmetrical key. Alternatively or in addition, such PUF circuitry may provide a random value which, for example, may serve as a seed for generating an asymmetric key value pair. Incorporation of PUF functionality with cryptographic logic may provide for protection of sensitive data on a device and/or support secure communications between devices.

FIG. 1 illustrates elements of a system 100 for providing cryptographic information according to an embodiment. System 100 may include a computer platform in accordance with any of various embodiments described herein, and may be a laptop computer, a desktop computer, handheld device (e.g. a smart phone, tablet, etc.) a server, a gaming or entertainment control system, a scanner, copier, printer, or other electronic device. System 100 may alternatively be a device to serve as a component of such a computer platform—e.g. where system 100 represents a system-on-chip (SoC) to be coupled to one or more other components of the computer platform. In an embodiment, system 100 may include, or be incorporated as a component in, any of a variety of devices (e.g. an automobile, a key fob, etc.) which are to provide data processing functionality.

System 100 may include a security module 110 to provide one or more security mechanisms for a host which, for example, is included in or coupled to system 100. By way of illustration and not limitation, system 100 may include one or more processor cores 120 to avail of cryptographic functionality of security module 110. Such cryptographic functionality may include encryption and/or decryption of data stored by a computer platform including system 100, data exchanged within the platform, data exchanged between platforms, and the like. In an illustrative embodiment, the one or more processor cores 120 may include a core or cores of a host processor (e.g. a CPU) which is for general purpose data processing. System 100 may further comprise a memory 130 to store state information such as that for an operating system and one or more applications executing with one or more processor cores 120. Software executing with one or more processor cores 120 and memory 130 may facilitate data exchanged via I/O logic 140 (e.g. a bus interface, transceiver, touchpad, touch display, mouse, keyboard, network interface and/or the like) of system 100.

In response to execution of such software, security module 110 may exchange control and/or data signals to facilitate the providing of a cryptography functionality which, for example, is based on a value provided by PUF circuitry 115 which is included in or coupled to security module 110. Such a value may, in one or more respects, be hidden from a host which is included in or coupled to system 100. For example, PUF circuitry 115 may provide to other circuitry of security module 110 a value which is not identifiable to the one or more cores 120.

Figure 2A:
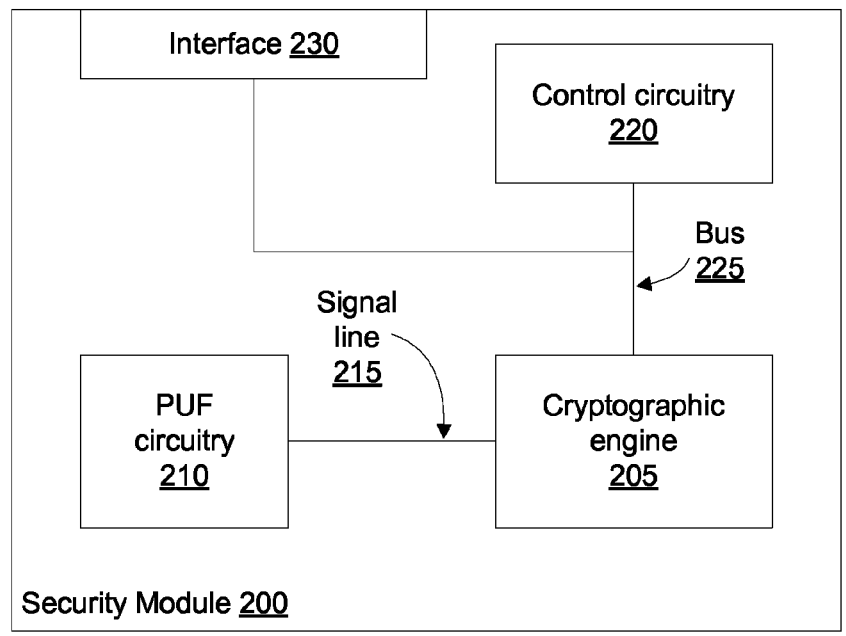
FIG. 2A is a block diagram illustrating elements of a security module for providing cryptographic information according to an embodiment.

FIG. 2A illustrates elements of a security module 200 for providing cryptographic information according to an embodiment. Security module 200 may provide functionality to operate in a platform having features such as those of system 100. For example, security module 200 provides some or all of the functionality of security module 110, in one embodiment.

Security module 200 may include an interface 230 to couple security module 200 to a host of the platform. By way of illustration and not limitation, interface 230 may include one or more contacts or other hardware to couple directly or indirectly with one or more cores of a host processor which is for general purpose computing such as execution of an operating system. Such one or more cores may reside on the same die as that which includes security module 200, although certain embodiments are not limited in this regard.

In an embodiment, interface 230 is to perform an exchange of data with the host—e.g. for security module 200 to provide cryptographic and/or other functionality for protecting information which is communicated, stored or otherwise processed by the platform. By way of illustration and not limitation, such functionality may include performing one or more of decryption, encryption, key generation, authentication, authorization and/or the like.

In an embodiment, security module 200 includes control circuitry 220 to communicate with the host, where based on such communication, control circuitry 220 is to signal other circuit logic of security module 200 to implement cryptographic functionality. Control circuitry 220 may communicate with the host via interface 230—e.g. where such control communications are also via a bus 225 coupling control circuitry 220 to interface 230. Alternatively, control circuitry 220 may communicate via a dedicated control interface (not shown), where interface 230 includes a data input and/or a data output which is distinct from such a control interface.

In an embodiment, security module 200 includes a cryptographic engine 205 to perform a cryptographic operation under the control of control circuitry 220, where the cryptographic operation is associated with the exchange of data via interface 230. For example, the cryptographic operation may be to process data received by security module 200 and/or to generate data to be sent from security module 200. Cryptographic engine 205 may be coupled to one or both of control circuitry 220 and interface 230 via bus 225, where cryptographic engine 205 outputs a result of the cryptographic operation to bus 225. Alternatively, cryptographic engine 205 may be coupled one of control circuitry 220 and interface 230 via a different bus or other signaling media.

Security module 200 may include PUF circuitry 210 which is to provide a value—referred to herein as a PUF value—which is generated based on physically unclonable characteristics unique to that particular PUF circuitry 210. The cryptographic operation may be performed by cryptographic engine 205 based on the PUF value from PUF circuitry 210. By way of illustration and not limitation, the PUF value may serve as a symmetric key, as an input for generating such a symmetric key, as an input for generating an asymmetric key value pair and/or the like.

The PUF circuitry 210 may provide the PUF value to cryptographic engine 205 using a signal line 215 of security module 200 which is distinct from bus 225. For example, communication of the PUF value between PUF circuitry 210 and cryptographic engine 205 may be independent of—i.e. exclude—any communication of the PUF value via bus 225. In an embodiment, any exchange of the PUF value by either of the cryptographic engine 205 and the PUF circuitry 210 is for communication of the PUF value which is independent of—e.g. exclusive of—bus 225. Access to the PUF value may be exclusive of bus 225 and, in an embodiment, exclusive of one or more elements of security module which are indirectly coupled to PUF circuitry 210 via bus 225 and signal line 215.

By way of illustration and not limitation, PUF circuitry 210 may only be coupled to bus 225 via other circuitry—e.g. including cryptographic engine 205—which is unable to communicate the PUF value to bus 225. Alternatively or in addition, the structure of PUF circuitry 210 may itself prevent PUF circuitry 210 from outputting at least that particular PUF value to bus 225.

Figure 2B:
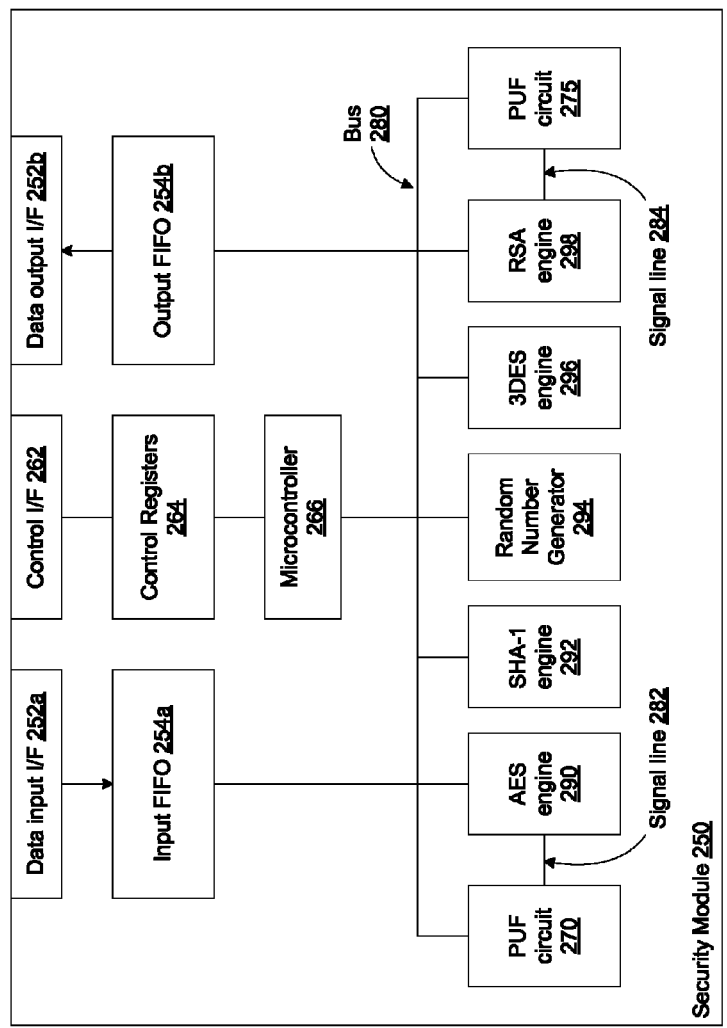
FIG. 2B is a block diagram illustrating elements of a security module for providing cryptographic information according to an embodiment.

FIG. 2B illustrates elements of a security module 250 for providing cryptographic information according to an embodiment. Security module 250 represents an example of one embodiment including some or all of the features of security module 110, for example.

Security module 250 may operate as a component in a computer or other electronic device platform to provide cryptographic functionality for a host of the platform. Logic such as that of interface 230 may include, for example, one or more of a data input interface (I/F) 252a for security module 250 to receive data from another component of the platform, an input first-in-first-out (FIFO) buffer 254a to buffer received data, a data output I/F 252b for security module 250 to send data to another component of the platform, and an output FIFO 254b to buffer data which is to be sent from security module 250. Security module 250 may include any of a variety of additional or alternative data I/O logic, according to different embodiments.

Control logic such as that of control circuitry 220 may include control registers 264 to store information for controlling the exchange of data with security module 250 and, in an embodiment, for controlling one or more cryptographic operations associated with the exchange of data. In an embodiment, the host accesses control registers 264 via a hardware control interface 262—e.g. where the host variously sends via control interface 262 messages of an application programming interface to read to and/or write from control registers 264. In another embodiment, control and data exchanges between security module 250 and other components of the platform may be via the same interface hardware of security module 250. Any of a variety of conventional memory mapping techniques may be adapted, for example, to provide addresses for the host to variously perform reads from or writes to control registers 264.

Security module 250 may further comprise a state machine or other control logic—e.g. represented by an illustrative microcontroller 266—to implement data exchanges based on information in control registers 264. For example, information in control registers 264 from the host may cause the microcontroller 266 to signal cryptography circuitry to perform one or more cryptographic operations associated with a data exchange. In an embodiment, some or all such cryptography circuitry is coupled to one or both of the control circuitry and the interface circuitry via a bus 280—e.g. where various cryptographic engines and/or other security engines are interconnected via bus 280.

By way of illustration and not limitation, the cryptographic circuitry may include one or more of an AES engine 290, a 3DES engine 296 and a RSA engine 298 to variously perform encryption, decryption and/or other security operations according to, respectively, an Advanced Encryption Standard (AES) algorithm, a Triple Data Encryption algorithm and a Rivest, Shamir, Adleman (RSA) algorithm. Security module 250 may further include other logic for securing data including, for example, a SHA-1 engine to perform a secure hash operation according to the SHA-1 secure hash algorithm standard, a random number generator 294 and/or the like. The particular number and variety of cryptographic (and other) engines shown coupled to bus 280 is merely illustrative of one embodiment, and may each vary according to implementation-specific details.

In an embodiment, security module 250 includes PUF circuitry coupled to at least one cryptographic engine via a signal line which is distinct from bus 280. By way of illustration and not limitation, security module 250 may include one or both of PUF circuit 270 coupled to AES engine 290 via signal line 282 and PUF signal line 275 coupled to RSA engine 298 via signal line 284. PUF circuits 270, 275 may variously exchange PUF values via signal lines 282, 284 respectively—e.g. where the architecture of security module 250 prevents access to at least one such PUF value via bus 280.

In certain embodiments, at least some PUF circuitry is coupled to a bus via a cryptographic engine (and a signal line for exchanging a PUF value) and further coupled to the bus independent of that cryptographic engine (and of the signal line)—e.g. where the PUF circuitry is also directly coupled to the bus. For example, one or both of PUF circuits 270, 275 may be further coupled directly to bus 280. In such an embodiment, some or all such PUF circuitry may be variously switched, multiplexed or otherwise configured to transition between different modes—e.g. including one mode for a PUF circuit to provide a first PUF value which is to be inaccessible to (and via) bus 280, and another mode for that PUF circuit to provide another PUF value to bus 280. Accordingly, certain embodiments provide for PUF values—and, for example, cryptographic keys, key value pairs, random numbers, etc. based on such PUF values—to be variously made selectively available to the host, secret from the host but available to logic of the security module, or secret from both the host and a subset of such logic of the security module.

Accordingly, PUF circuitry of security module 250 may output one or more other PUF values to bus 280 independent of either or both of signal lines 282, 284. By way of illustration and not limitation, PUF circuit 270 may provide via signal line 282 a PUF value which, for example, is to serve as a private symmetric key for a cryptographic operation by AES engine 290. In this example, "private" refers to the PUF value being hidden from bus 280 and at least some logic coupled thereto. Furthermore, PUF circuit 275 may provide via signal line 284 another PUF value which is to serve, for example, as a private asymmetric key for a cryptographic operation by RSA engine 298, or as a seed for generating such a key. In an embodiment, PUF circuit 275 includes logic (not shown) to receive an initial PUF value generated by other logic of PUF circuit 275 and to generate—e.g. based in part on conventional techniques—an asymmetric key value pair based on that initial PUF value. The keys of such an asymmetric key value pair may themselves each be considered PUF values, insofar as their values are based on PUF characteristics of PUF circuit 275. Alternatively or in addition, PUF circuit 275 may further output to bus 280 still another PUF value to serve, for example, as a comparatively less private (in this example, accessible to bus 280 and at least some logic coupled thereto) asymmetric key, or as a seed for generating such an asymmetric key. Alternatively or in addition, may further output to bus 280 still another PUF value to serve, for example, as a comparatively less private symmetric key. A PUF value output directly to bus 280 may be made accessible to any of multiple cryptographic engines and/or other logic of security module 250.

Figure 3:
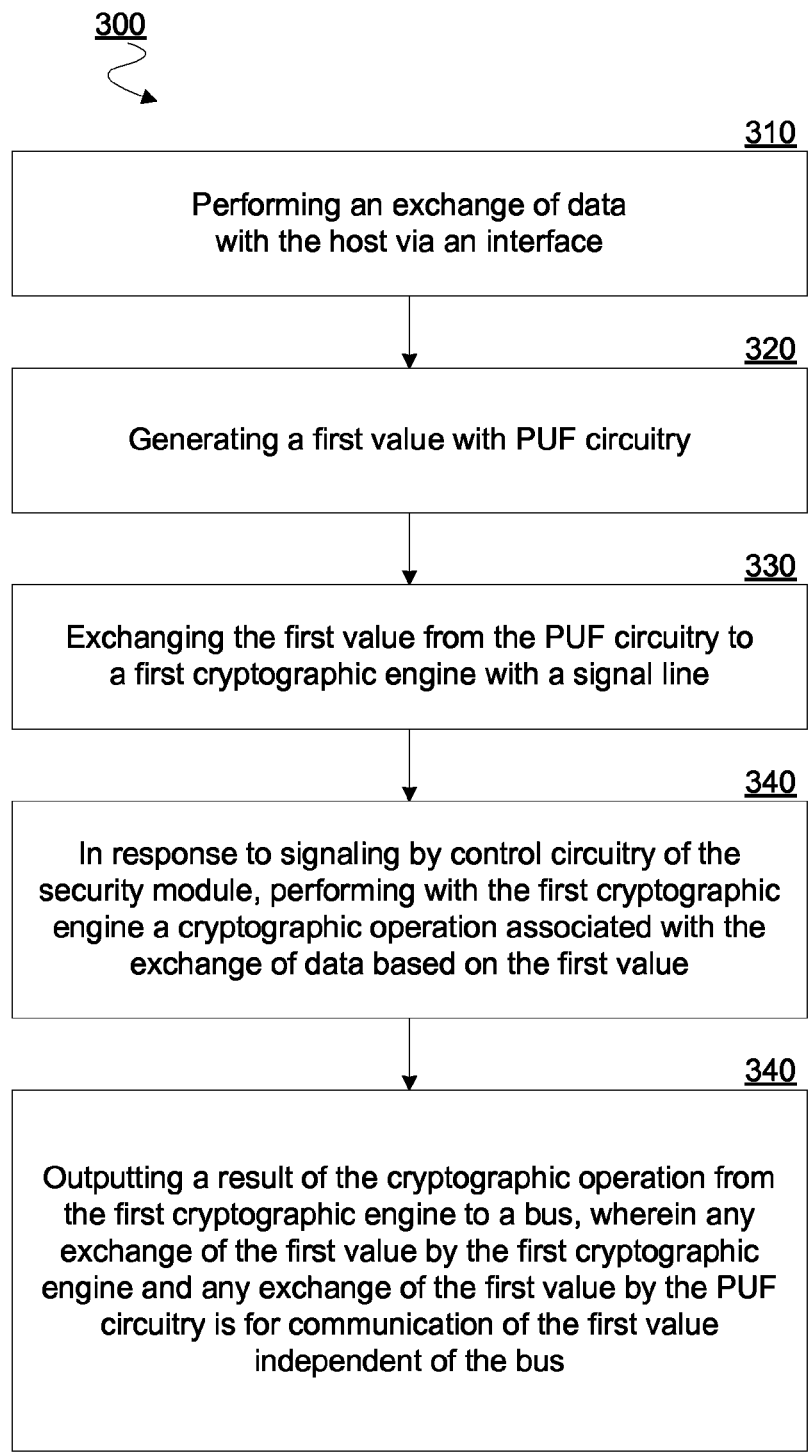
FIG. 3 is a flow diagram illustrating elements of a method for operating a security module according to an embodiment.

FIG. 3 illustrates elements of a method 300 for operating a security module according to an embodiment. Method 300 may be performed at a security module having some or all of the features of security module 200, for example. In an embodiment, method 300 is performed for the security module to serve as a component of a computer or other platform—e.g. to provide cryptography functionality for a host of that platform.

Method 300 may include, at 310, performing an exchange of data with the host via an interface of the security module. The exchange may include, for example, a receipt of the data by the security module from the host and/or a communication of the data from the security module to the host. In an embodiment, method 300 further includes, at 320, generating a first value with PUF circuitry of the security module. Generation of the first value at 320 may include the PUF circuitry performing what is referred to herein as a deterministic generation of the first value—e.g. as distinguished from non-deterministic generation of a value. As used herein with respect to the generation of a PUF value by PUF circuitry, "deterministic" refers to the ability of one specific hardware implementation of PUF circuitry to consistently generate the same PUF value repeatedly over time—e.g. in a variety of instances and/or environmental conditions. For example, the PUF circuitry may be able to provide such a PUF value (for brevity, referred to herein as a "deterministic PUF value") across system reboots, wake ups or power state cycles of the platform and/or under different temperature, voltage or other conditions of the platform. The deterministic PUF value may be provided as a secret key which, due to the PUF characteristics of the PUF circuitry, is particular to that specific hardware implementation of the security module.

In another embodiment, the generation of the first value at 320 may include the PUF circuitry performing a non-deterministic generation of the first value. For example, a specific hardware implementation of the PUF circuitry may include a circuit of a type which varies in operation not only across different hardware implementations of that same PUF circuitry, but across different instances of such operation by that specific hardware implementation of the PUF circuitry. A non-deterministic PUF circuit may be highly variable with system voltage, temperature and/or other environmental conditions, for example. In an embodiment, such non-deterministic generation of a PUF value may be adapted to perform random number generation. By way of illustration and not limitation, non-deterministic PUF circuitry may include a first circuit to generate a seed value and a second circuit to receive the seed value and to generate—e.g. non-deterministically—a random number based on the seed value. In such an embodiment, one or both of the first circuit and the second circuit is a PUF circuit.

Method 300 may further comprise, at 330, exchanging the first value from the PUF circuitry to a first cryptographic engine of the security module with a signal line. In response to signaling by control circuitry of the security module, method 300 may include, at 340, performing with the first cryptographic engine a cryptographic operation associated with the exchange of data at 310, where the cryptographic operation is based on the first value. By way of illustration and not limitation, the cryptographic operation may include the first cryptographic engine performing one or more of an encryption of at least part of the data, a decryption to generate at least part of the data, an authentication of the data, the generating of authentication information (e.g. signing) for future authentication of the data and/or the like.

In an embodiment, the first value serves as a symmetric key for the cryptographic operation—e.g. wherein the cryptographic operation includes a calculation according to an AES algorithm. Alternatively or in addition, the cryptographic operation may include the first cryptographic engine generating an asymmetric key value pair based on the first value. For example, the cryptographic operation may include a calculation according to a RSA algorithm. Any of a variety of otherwise conventional cryptographic operations may be adapted to be variously performed based on a PUF value which is a secret kept from the host and, in certain embodiments, from at least some control, interface or other circuitry within the security module itself.

Method 300 may further comprise, at 350, outputting a result of the cryptographic operation from the first cryptographic engine to a bus of the security module. The bus may be coupling the first cryptographic engine to the control circuitry or the interface (or both) wherein any exchange of the first value by the first cryptographic engine and any exchange of the first value by the PUF circuitry is for communication of the first value independent of (e.g. excludes) the bus. For example, in an embodiment, any exchange of the first value by either of the first cryptographic engine and the PUF circuitry is exclusive of the first value being exchanged via the bus. The limited access to a PUF value within the security module may be due, for example, to one or more of an absence of any direct connection of a PUF circuit to the bus, an absence in the PUF circuit (and/or in a cryptographic engine) of any output which will provide that particular PUF value to the bus, the absence of any instruction in an API to cause the PUF value to be output to the bus, etc.

With limited access to a PUF value which is a basis for its own cryptography functionality, a security module may be adapted according to different embodiments to perform otherwise conventional data encryption, data decryption authentication and/or other security operations. Additionally or alternatively, such a security module may be adapted to provide any of various novel security operations including, for example, certain new types of software authentication protection.

Various existing methods for securing operating systems—e.g. in mobile applications—use what is referred to as a trusted execution environment (TEE) such as that as specified by the GlobalPlatforms group. As used herein, "trusted execution environment" (or TEE) refers to software which is isolated in one or more respects from security risks to which other executing software is exposed. Such environments operate outside the general-purpose (or "rich") operating system, for example, and are provided a security barrier for certain resources of the platform. Platform hardware may provide a mechanism for switching between the TEE and a general purpose execution environment, commonly referred to as a Rich OS Execution Environment (REE). A platform hardware architecture may support partitioning of access based upon these two execution environments, provide security for data and instructions stored in RAM or other data storage, specify which execution environments may access which peripherals and/or provide any of various other access control mechanisms. Traditionally, a software Application Programmer Interface (API) is utilized in order for software developers to avail of such platform hardware. Examples of such APIs include the TrustZone API specification of ARM and the TEE Client API released by GlobalPlatform in July 2010.

One of the more broadly accepted conventional techniques for safeguarding a TEE is to use a secure-boot process to validate a bootloader prior to execution. Traditionally a secure-boot starts by executing from a secure ROM of the platform. Software executing from such a secure ROM may measure and validate a next stage bootloader—e.g. prior to transferring execution. This process may continue repeatedly until a kernel is loaded, creating a chain of trust from the secure ROM to the kernel. In an embodiment, a security module may be adapted to provide cryptography functionality to support the authentication of software which provides, or is included in, a trusted execution environment of a platform.

Figure 4:
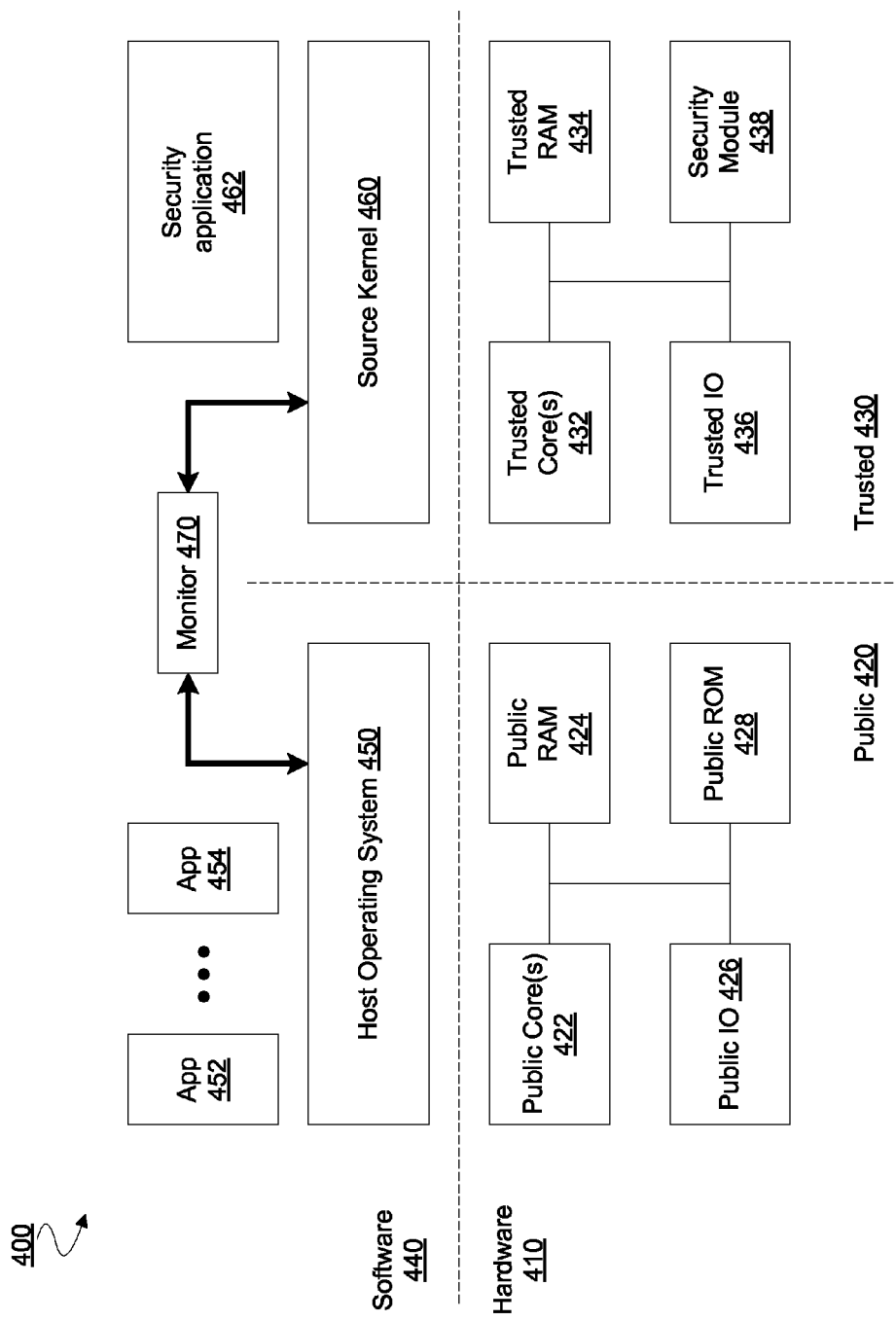
FIG. 4 is a block diagram illustrating elements of a computer platform for providing an execution environment according to an embodiment.

FIG. 4 illustrates elements of a system 400 for authenticating TEE software according to one embodiment. System 400 may include some or all of the features of system 100, for example. In an embodiment, hardware 410 of system 400 includes trusted (secure) resources 430 and public (unsecure) resources 420. By way of illustration and not limitation, public resources 420 may include some or all of one or more public cores 422 of a host processor such as a central processing unit (CPU), public random access memory (RAM) 424, public read-only memory (ROM) 426 and public IO logic 426. Software 440 of system 400 may include one or more public (e.g. general purpose) computing processes which comprise an REE of the platform. Such public software processes may include a host operating system (OS) 450 which, for example, executes with the one or more public cores 422 and with public RAM 424. Host OS 450 may in turn facilitate execution of one or more applications—e.g. represented by the illustrative apps 452, . . . , 454—which are to access data in public ROM 428 and/or to exchange data via public IO 426, for example. The public hardware resources 420 and REE software of system 400 is merely illustrative of one embodiment, and may vary according to implementation-specific details.

Alternatively or in addition, trusted resources 430 may include some or all of one or more trusted cores 432 of a processor, trusted RAM 434, trusted IO logic 436 and a security module 438 such as security module 200. Software 440 may further comprise a TEE which executes with trusted resources 430. Such a TEE may include, for example, a source kernel 460 which executes with the one or more trusted cores 432 and with trusted RAM 434. Source kernel 460 may in turn facilitate execution of one or more trusted applications—e.g. represented by the illustrative security application 462—which in turn may access cryptography functionality of security module 438. By way of illustration and not limitation, one or both of source kernel 460 and security application 462 may access security module 438 to protect data which is exchanged via trusted IO 436 between trusted hardware resources 430 and public hardware resources 420. A monitor process 470 may provide for exchanges between TEE processes and REE processes. The trusted hardware resources 430 and TEE software of system 400 is merely illustrative of one embodiment, any may vary according to implementation-specific details.

Certain embodiments variously avail of PUF circuitry to generate a unique-per-device secret key that may be used to provide authentication security for TEE and/or other code which, for example, resides in non-volatile storage of the platform. The PUF circuitry may tie in directly to a cryptographic engine of a security module—e.g. in the same SoC—and may be directly accessible by only some logic of the security engine (e.g. including the cryptographic engine). Code executing from the secure ROM may then send a command to the security module for the cryptographic engine to decrypt and load a next-stage bootloader, for example.

In an embodiment, security module 438 uses a unique per-device PUF value to encrypt some or all TEE code as it resides on disk—e.g. including the code for source kernel 460 and/or for security application 462—or, alternatively, to encrypt a key that is used to encrypt such TEE code. In such an embodiment, PUF circuitry of security module 438 may be expected to deterministically generate a consistent, repeatable value for the device-secret key. Multiple secret keys may be generated if needed, allowing for redundant copies in the event that one multiple PUF circuits fails.

To support encryption and protection of TEE code, certain embodiments may store a TEE code header—e.g. at the beginning of a disk drive—similar to the Master Boot Record (MBR) used on many desktop systems. This header may contain information describing the TEE code. An example of such a header is shown in List 1.

| List 1: Example TEE Header | |
|---|---|
| Section | Size |
| TEE marker | 4 bytes |
| TEE version | 4 bytes |
| TEE SHA-256 hash encrypted | 20 bytes |
| TEE encryption routine | 4 bytes |
| TEE size | 8 bytes |
| Offset to boot-loader | 8 bytes |
| TEE manufacturer | 80 bytes |
| Padding | 384 bytes |

During system boot-up, information from the TEE header may be provided to security module 438—e.g. by an initial boot-loader process executing with the one or more trusted cores 432 and trusted RAM 434. The security module may receive the TEE code and decrypt the TEE code and/or evaluate a SHA-256 (or other) hash for the TEE code to verify whether the TEE was maliciously altered. Such decryption and/or hash evaluation may be based on a PUF value which, for example, is unique to PUF circuitry (not shown) of security module 438 and which is a secret value only directly available to some—e.g. only a subset of—logic within security module 438. Once the TEE code has been located, decrypted, and verified, execution may be passed to the TEE code and the boot process may continue.

The above-described embodiment may not prevent the alteration of TEE code. Rather, such an embodiment may intentionally allow the TEE code to be updated, for example. The platform may receive a new version of TEE code from a source which has been authenticated and authorized—e.g. according to conventional techniques. Security module 438 may subsequently receive the new TEE code (from the one or more trusted codes 432, for example), encrypt the TEE code and calculate a hash value for the encrypted TEE code. In an embodiment, such encryption and hash operations may be based on a device-specific secret PUF value of security module 438, as discussed herein.

The new TEE code, in its encrypted form, may then be written to disk, and the new hash stored at the proper location in the TEE header. The ability to perform a TEE update may be controlled via TEE code and/or boot code in a secure ROM, where such code includes functionality for verifying the authenticity of a received TEE update. The architecture illustrated in security module 200, for example, allows such a TEE code update to occur, while prohibiting an attacker from removing a non-volatile storage which stores the TEE code and booting in a non-secure fashion, or from modifying the TEE code and overwriting the TEE code hash.

Figure 5A:
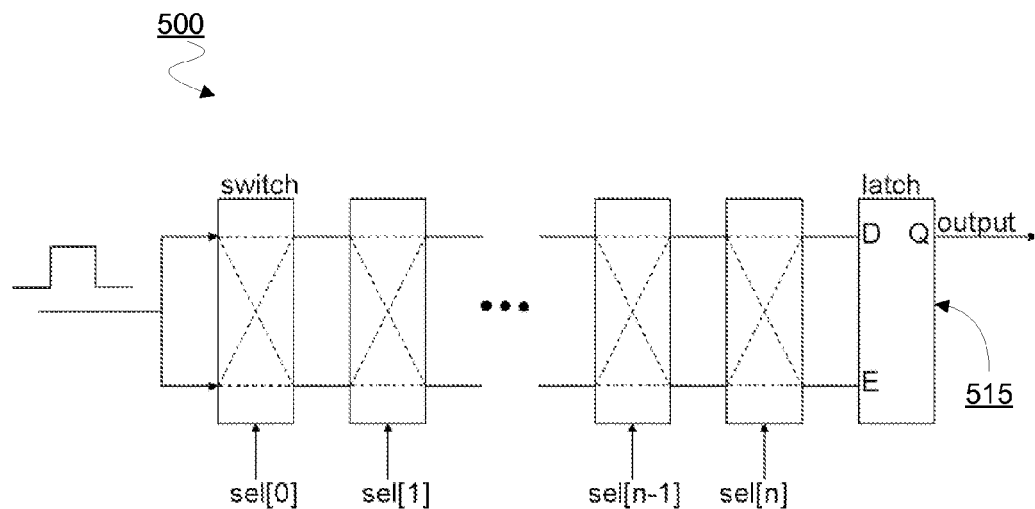
FIGS. 5A, 5B illustrate elements of a physically unclonable function circuit for providing cryptographic key information according to an embodiment.
Figure 5B:
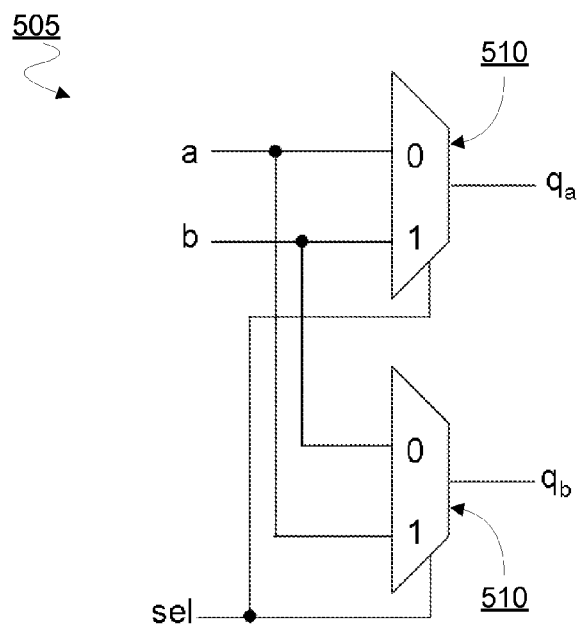

FIGS. 5A, 5B, 6 and 7 represent examples of some types of PUF circuits which may be adapted to variously provide PUF values for security module logic according to different embodiments. FIG. 5A is a logic circuit diagram of an arbiter PUF 500. Each stage of arbiter PUF 500 is a switch circuit 505, illustrated in FIG. 5B. FIG. 5B illustrates that switch circuit 505 includes a pair of two input multiplexers 510 with a shared select signal (SEL). When SEL is '1' the upper input a is routed to the lower output, qb, and the lower input b is routed to the upper output, qa. When SEL is '0' the inputs are not crossed over, and the a and b inputs pass straight through the module. Arbiter PUF 500 chains n switch circuits 505 together. At the first stage a pulse is presented to the a and b inputs at the same time. The signal then races along the two paths through the circuit, switching between the lower and upper paths as determined by the SEL input at each stage. After the last stage of arbiter PUF 500, an arbiter (e.g., latch 515) determines the output of the circuit; if the D input arrives first the output is '0' and if the E input arrives first the output is '1'.

Arbiter PUF 500 accepts an n-bit input SEL and produces as output a single bit. This generates a challenge-response pair wherein the challenge is the input, or sequence of inputs, and the response is the output or sequence of outputs. As such, this PUF has an intrinsic challenge-response capability. The PUF output is the response to a particular challenge. To achieve a k-bit response, one may provide k different inputs to a single arbiter PUF 500, evaluate k instantiations of arbiter PUF 500, or some combination thereof.

Figure 6:
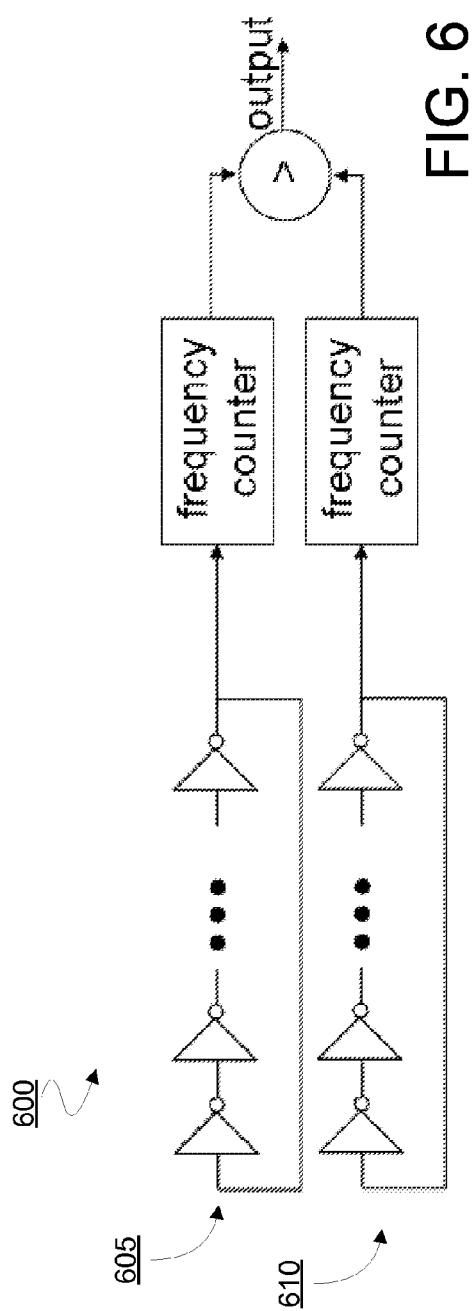
FIGS. 6 and 7 each illustrates elements of a respective physically unclonable function circuit for providing cryptographic key information according to different embodiments.

FIG. 6 is a logic circuit diagram of a ring oscillator PUF 600. Ring oscillator PUF 600 exploits variations in the resonance frequencies of a set of identical ring oscillators 605 and 610. To produce an output bit the resonance frequencies of ring oscillators 605 and 610 are compared and the output bit is determined by which oscillator is fastest. A k bit sequence is produced by making k comparisons between multiple different ring oscillators; however, one should be careful to choose independent, uncorrelated comparisons. If the resonance frequency for oscillator i is fosci, then if we have fosc1>fosc2 and fosc2>fosc3, then fosc1>fosc3, and the bit generated by comparing fosc1 to fosc3 is correlated to the bits produced by the other comparisons. When compared to arbiter PUF 500, disadvantages of ring oscillator PUF 600 include area, speed, and power dissipation. However, ring oscillator PUF 600 is likely easier to implement since it does not require routing two long, almost identical paths across an ASIC or FPGA, as is the case with arbiter PUF 500.

Figure 7:
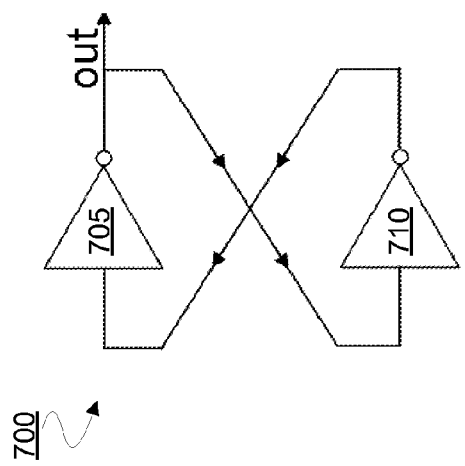

FIG. 7 is a logic circuit diagram of a cross-coupled PUF 700. Cross-coupled PUF 700 uses a positive feedback loop to store a bit. Without applying any external stimulus, the output of cross-coupled PUF 700 will attain a stable output. The value of this output results from differences in interconnect delay and the voltage transfer characteristics of the inverters 705 and 710. A k bit sequence can be obtained from k cross-coupled inverter pairs. Other logic gates, such as NAND and NOR gates, can also be connected in a cross-coupled configuration to be used as a PUF.

Figure 8:
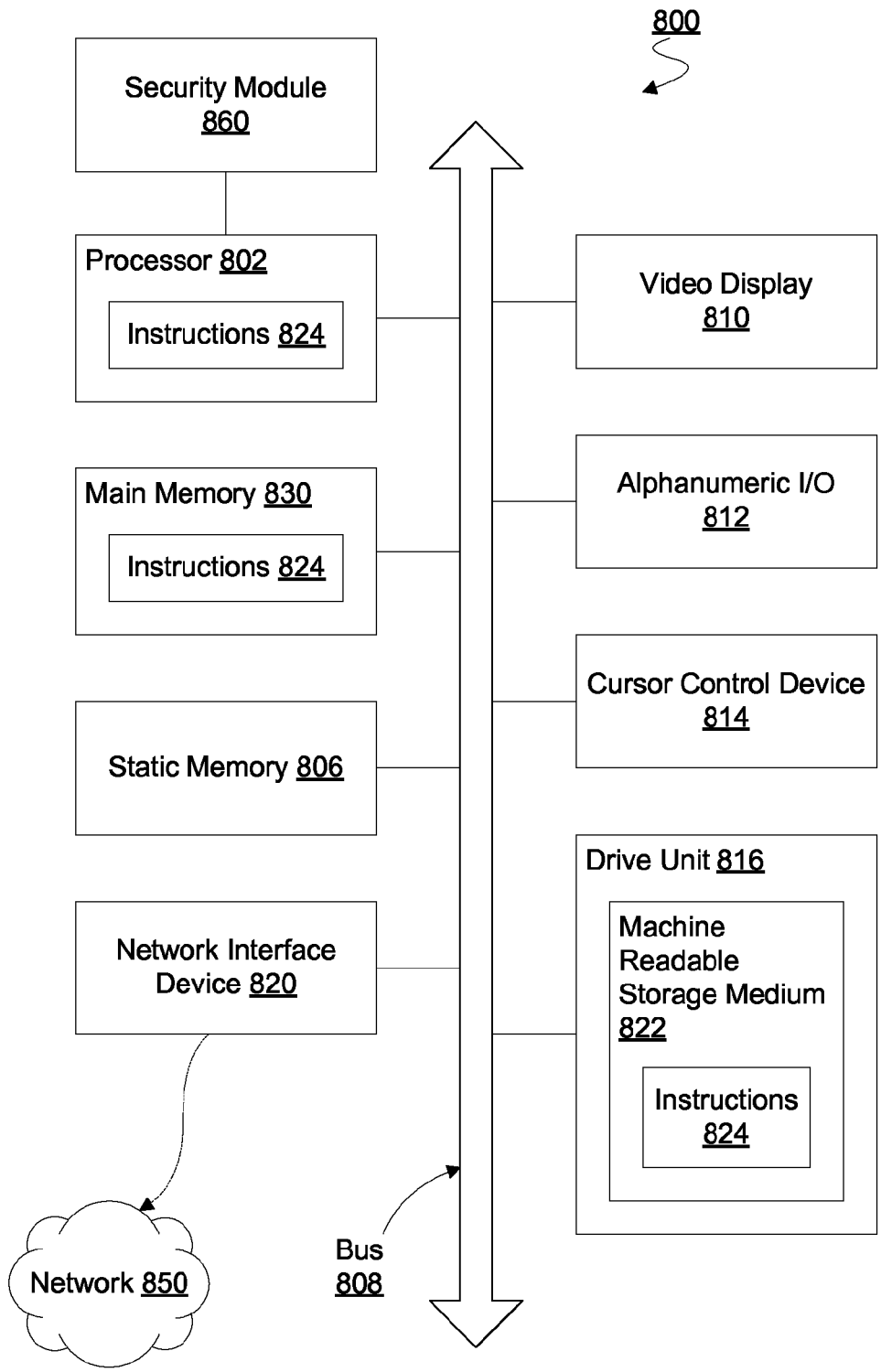
FIG. 8 is a block diagram illustrating elements of a system for providing cryptographic key information according to an embodiment.

FIG. 8 illustrates select elements of an exemplary form of a computer system 800 to provide cryptographic key information according to an embodiment. In various embodiments, the computer system 800 may operate as a standalone device or may be connected (e.g., networked) to other machines. In a networked deployment, the computer system 800 may operate in the capacity of a server or a client machine in server-client network environment, or as a peer machine in a peer-to-peer (or distributed) network environment. The computer system 800 may be a personal computer (PC), a tablet PC, a set-top box (STB), a Personal Digital Assistant (PDA), a cellular telephone, a web appliance, or any machine capable of executing a group of instructions (sequential or otherwise) that specify actions to be taken by that machine. Further, while only a single machine is illustrated, the term "machine" shall also be taken to include any collection of machines that individually or jointly execute a group (or multiple sets) of instructions to perform any one or more of the methodologies discussed herein.

The exemplary computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)) to implement a display. The computer system 800 may also include an alphanumeric input device 812 (e.g., a keyboard), a user interface (UI) navigation device 814 (e.g., a mouse), a disk drive unit 816 and/or a network interface device 820.

The disk drive unit 816 may include a machine-readable storage medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable storage media. The software 824 may further be transmitted or received over a network 826 via the network interface device 820 utilizing any one of a number of well-known transfer protocols (e.g., HTTP). In an embodiment, execution of software 824 is to access cryptography functionality of a security module 860 according to an embodiment—e.g. where security module 860 is to exchange data with processor 802 for providing such cryptography functionality.

While the machine-readable storage medium 822 is shown in an exemplary embodiment to be a single medium, the term "machine-readable storage medium" should be taken to include a single storage medium or multiple storage media (e.g., a centralized or distributed database, and/or associated caches and servers) that store the one or more sets of instructions. The term "machine-readable storage medium" shall also be taken to include any medium that is capable of storing a group of instructions for execution by the machine and that cause the machine to perform any one or more of the methodologies of the present invention, or that is capable of storing data structures utilized by or associated with such a group of instructions. The term "machine-readable storage medium" shall accordingly be taken to include, but not be limited to, solid-state memories, optical and magnetic storage media, etc.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (e.g., stores) information in a form accessible by a machine (e.g., a computer, network device, personal digital assistant, manufacturing tool, any device with a set of one or more processors, etc.). For example, a computer-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus comprising:
   an interface to couple the apparatus to a host and to perform an exchange of data with the host;
   physically unclonable function (PUF) circuitry configured to generate a first value;
   a first cryptographic engine coupled to receive the first value from the PUF circuitry;
   control circuitry coupled to signal the first cryptographic engine to perform a cryptographic operation associated with the exchange of data, wherein the first cryptographic engine is configured to perform the cryptographic operation based on the first value;
   a first signal line coupled between the PUF circuitry and the first cryptographic engine, wherein the first cryptographic engine is coupled to receive the first value from the PUF circuitry via the first signal line; and
   a bus coupling the first cryptographic engine to the control circuitry or the interface, wherein the first cryptographic engine is coupled to output a result of the cryptographic operation to the bus, wherein any exchange of the first value by the first cryptographic engine and any exchange of the first value by the PUF circuitry is for communication of the first value independent of the bus, wherein the bus is further coupled to the PUF circuitry independent of the first signal line, wherein the PUF circuitry is further configured to output a second value to the bus independent of the second value being exchanged via the first signal line.

2. The apparatus of claim 1, wherein the PUF circuitry configured to generate the first value includes the PUF circuitry configured to perform a deterministic generation of the first value.

3. The apparatus of claim 1, wherein the PUF circuitry includes:
   a first PUF circuit configured to perform a deterministic generation of a second value; and
   a random number generator circuit coupled to receive the second value, wherein the PUF circuitry configured to generate the first value includes the random number generator circuit configured to generate the first value in response to the received second value.

4. The apparatus of claim 3, wherein the random number generator circuit includes a PUF circuit.

5. The apparatus of claim 1, wherein the PUF circuitry is configured to provide the second value as a symmetric key.

6. The apparatus of claim 1, wherein the PUF circuitry is configured to perform a non-deterministic generation of the second value.

7. The apparatus of claim 1, further comprising a second cryptographic engine coupled to the bus, the second cryptographic engine configured to receive the second value and to generate an asymmetric key value pair based on the second value.

8. The apparatus of claim 1, wherein the cryptographic operation is configured to evaluate software code for a trusted execution environment.

9. The apparatus of claim 1, wherein the first value is a symmetric key for the cryptographic operation.

10. The apparatus of claim 1, wherein the first cryptographic engine configured to perform the cryptographic operation includes the first cryptographic engine configured to generate an asymmetric key value pair based on the first value.

11. A method at a security module coupled to a host, the method comprising:
    performing an exchange of data with the host via an interface of the security module;
    generating a first value with physically unclonable function (PUF) circuitry;
    exchanging the first value from the PUF circuitry to a first cryptographic engine with a signal line;
    in response to signaling by control circuitry of the security module, performing with the first cryptographic engine a cryptographic operation associated with the exchange of data based on the first value;
    outputting a result of the cryptographic operation from the first cryptographic engine to a bus of the security module, the bus coupling the first cryptographic engine to the control circuitry or the interface, wherein any exchange of the first value by the first cryptographic engine and any exchange of the first value by the PUF circuitry is for communication of the first value independent of the bus; and
    outputting a second value from the PUF circuitry to the bus independent of any communication of the second value via the signal line.

12. The method of claim 11, wherein generating the first value includes performing a deterministic generation of the first value.

13. The method of claim 11, further comprising:
    performing with a first PUF circuit of the PUF circuitry a deterministic generation of a second value,
    receiving the seed value at a random number generator of the PUF circuitry, wherein generating the first value includes the random number generator circuit generating the first value in response to the received second value.

14. The method of claim 11, further comprising:
    receiving the second value at a second cryptographic engine coupled to the bus; and
    generating an asymmetric key value pair based on the second value.

15. The method of claim 11, wherein the cryptographic operation to evaluate software code for a trusted execution environment.

16. A system comprising:
    a host including one or more processor cores;
    a security module including:
       an interface coupling the security module to the host, the interface to perform an exchange of data with the host;
       physically unclonable function (PUF) circuitry configured to generate a first value;
       a first cryptographic engine coupled to receive the first value from the PUF circuitry;
       control circuitry coupled to signal the first cryptographic engine to perform a cryptographic operation associated with the exchange of data, wherein the first cryptographic engine is configured to perform the cryptographic operation based on the first value;
       a first signal line coupled between the PUF circuitry and the first cryptographic engine, wherein the first cryptographic engine is coupled to receive the first value from the PUF circuitry via the first signal line; and a bus coupling the first cryptographic engine to the control circuitry or the interface, wherein the first cryptographic engine is coupled to output a result of the cryptographic operation to the bus, wherein any exchange of the first value by the first cryptographic engine and any exchange of the first value by the PUF circuitry is for communication of the first value independent of the bus, wherein the bus is further coupled to the PUF circuitry independent of the first signal line, wherein the PUF circuitry is further configured to output a second value to the bus independent of the second value being exchanged via the first signal line.

17. The system of claim 16, wherein the PUF circuitry is configured to perform a deterministic generation of the first value.

18. The system of claim 17, wherein the PUF circuitry is configured to perform a non-deterministic generation of the second value.

19. The system of claim 16, further comprising a second cryptographic engine coupled to the bus, the second cryptographic engine configured to receive the second value and to generate an asymmetric key pair based on the second value.

20. The system of claim 16, wherein the cryptographic operation is configured to evaluate software code for a trusted execution environment.

* * * * *